United States Patent [19]

Brown

[11] 4,171,209
[45] Oct. 16, 1979

[54] APPARATUS FOR REMOVING CONDENSATE FROM STEAM LINES, AND THE LIKE

[75] Inventor: Timothy S. Brown, Houston, Tex.

[73] Assignee: Thermal Con-Serv Corp., Houston, Tex.

[21] Appl. No.: 765,939

[22] Filed: Feb. 7, 1977

[51] Int. Cl.² .......................... B01D 46/10; F15D 1/02
[52] U.S. Cl. ........................ 55/466; 55/487; 55/502; 55/503; 210/450; 210/451; 210/455; 210/495; 138/41
[58] Field of Search .................. 210/445–447, 210/449–451, 453–455, 459, 495; 55/466, 486, 487, 488, 502, 503, 511, 509; 138/40, 41, 44

[56] References Cited

U.S. PATENT DOCUMENTS

| | | | |
|---|---|---|---|
| 680,096 | 8/1901 | West | 210/445 |
| 1,156,274 | 10/1915 | Cormeny | 210/451 |
| 1,171,116 | 2/1916 | Haeseler | 55/503 |
| 2,059,017 | 10/1936 | Nickle | 55/485 |
| 2,091,044 | 8/1937 | Hewitt | 210/495 |
| 2,604,958 | 7/1952 | Leufenius | 210/459 |
| 3,441,145 | 4/1969 | Pearson | 210/446 |
| 3,715,870 | 2/1973 | Guzick | 210/445 |
| 3,732,985 | 3/1973 | Murrell | 210/446 |
| 3,797,665 | 3/1974 | Paquette | 210/447 |
| 3,877,895 | 4/1975 | Guzick et al. | 55/466 |
| 4,028,248 | 6/1977 | Murauskas et al. | 210/445 |

FOREIGN PATENT DOCUMENTS 196029 4/1923 United Kingdom ..................... 55/503

*Primary Examiner*—David L. Lacey
*Attorney, Agent, or Firm*—Carl B. Fox, Jr.

[57] ABSTRACT

Apparatus for removing condensate from steam lines, and the like, wherein an orifice is provided in a condensate drain line as new equipment or to replace a conventional condensate trap. A number of embodiments of apparatus are presented. The apparatus includes novel unitary apparatuses and novel means for connecting the apparatus to other equipment.

22 Claims, 28 Drawing Figures

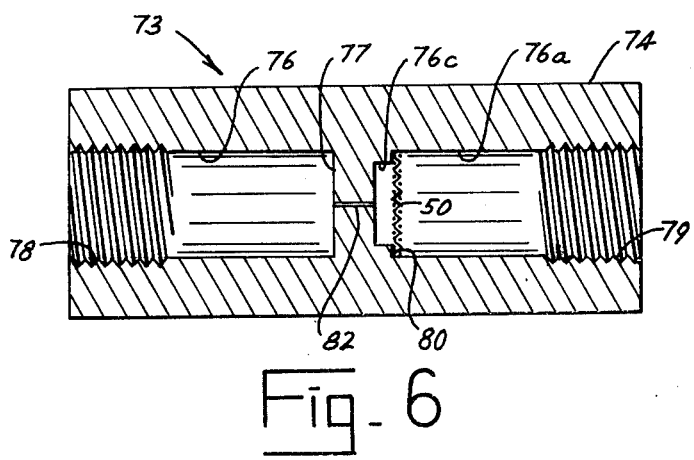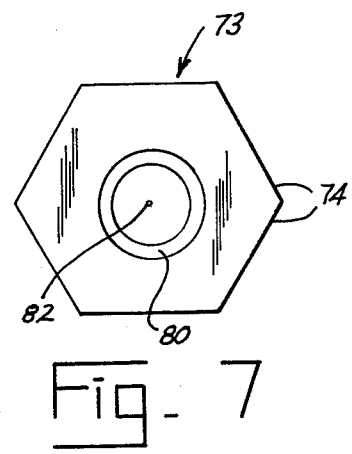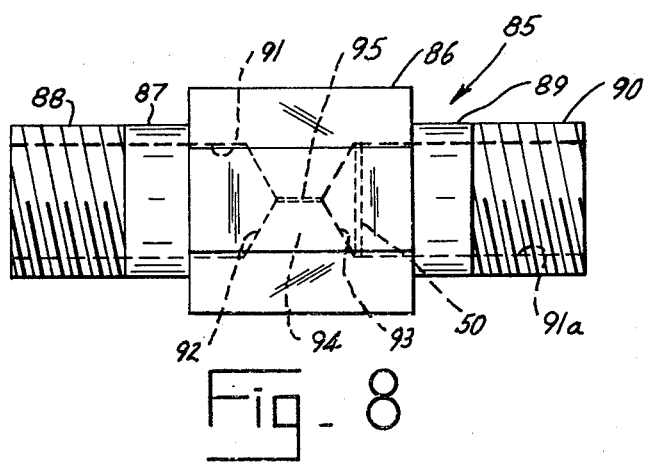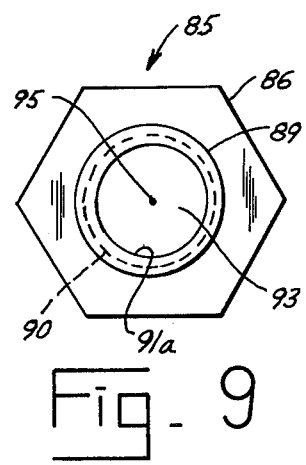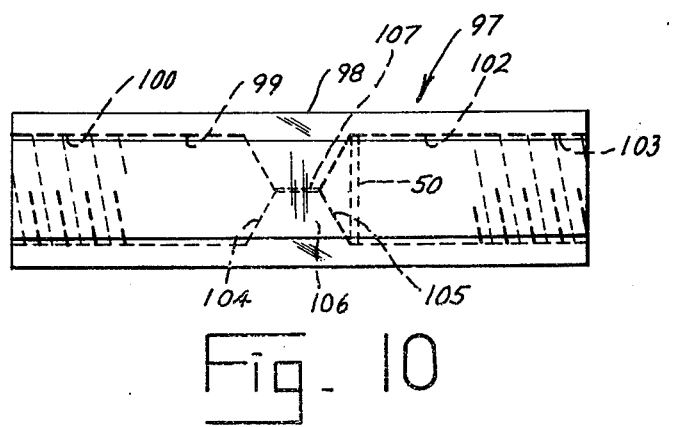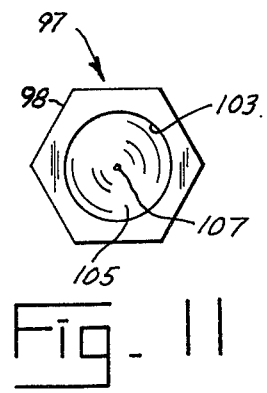

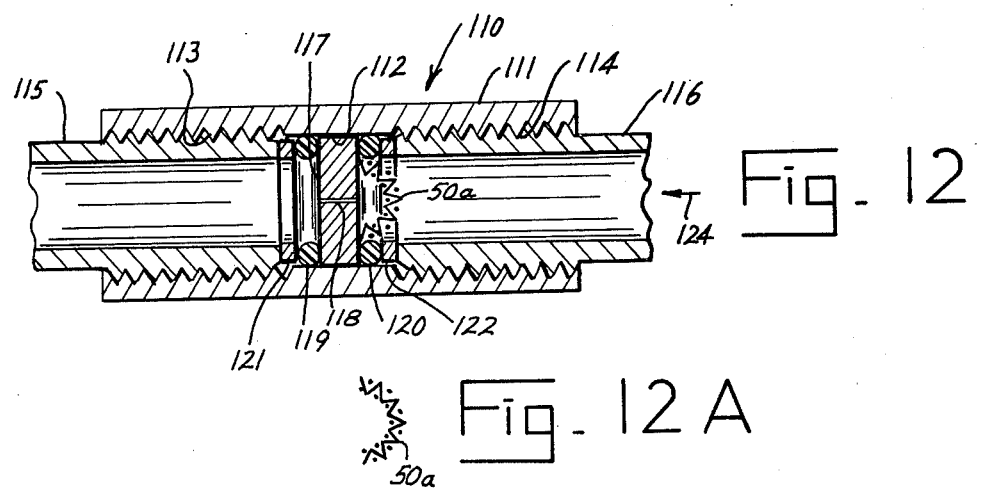
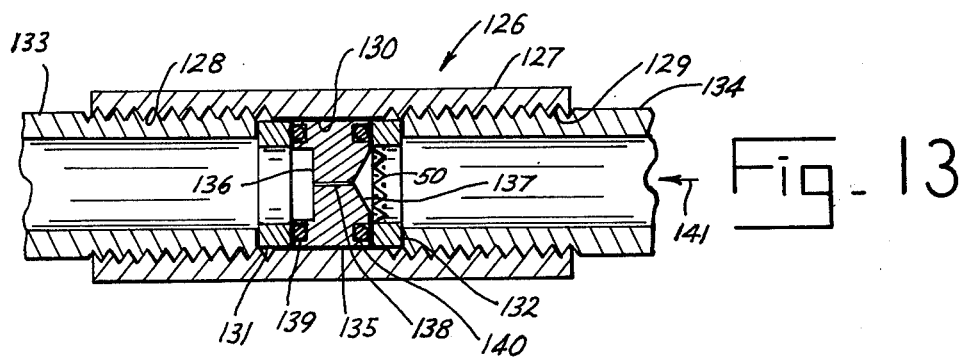
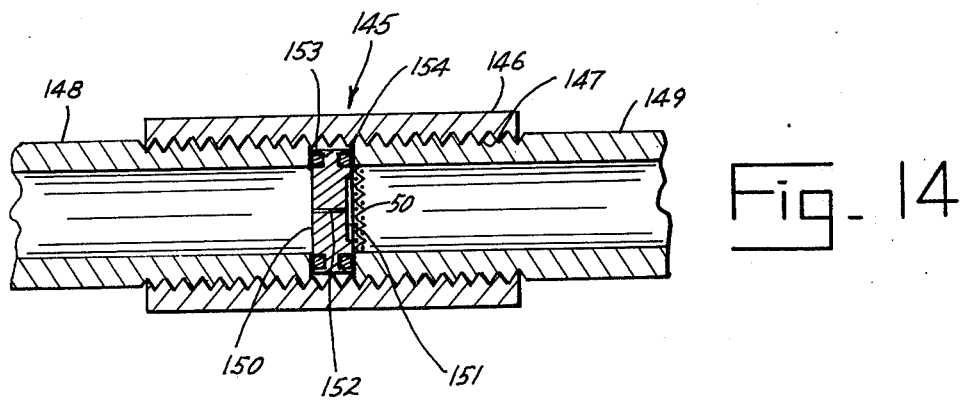

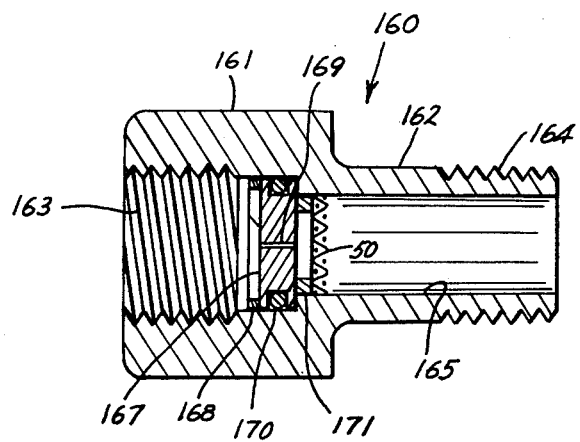
Fig_15
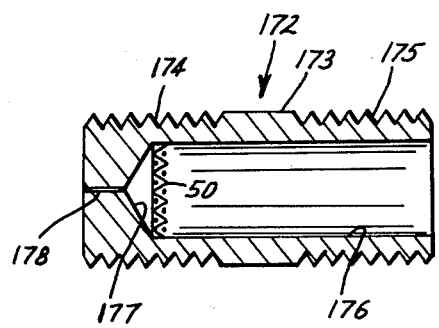
Fig_16
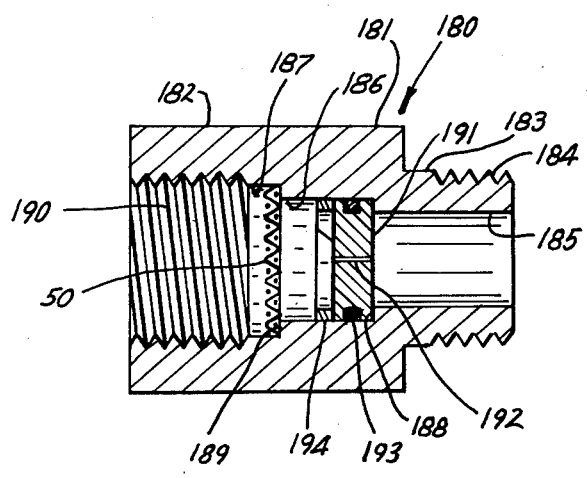
Fig_17

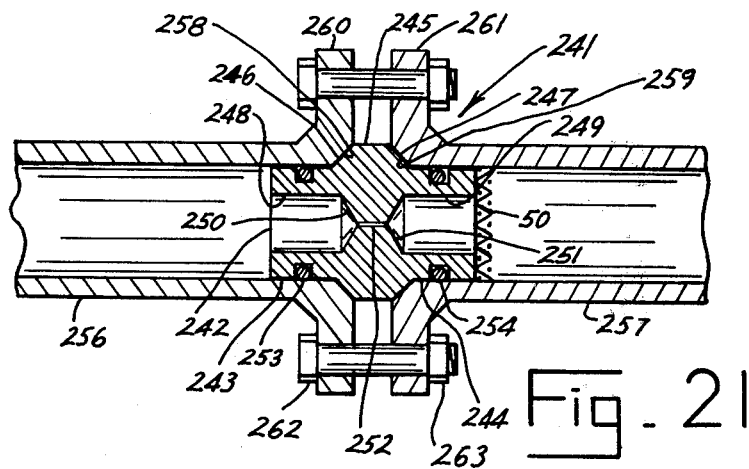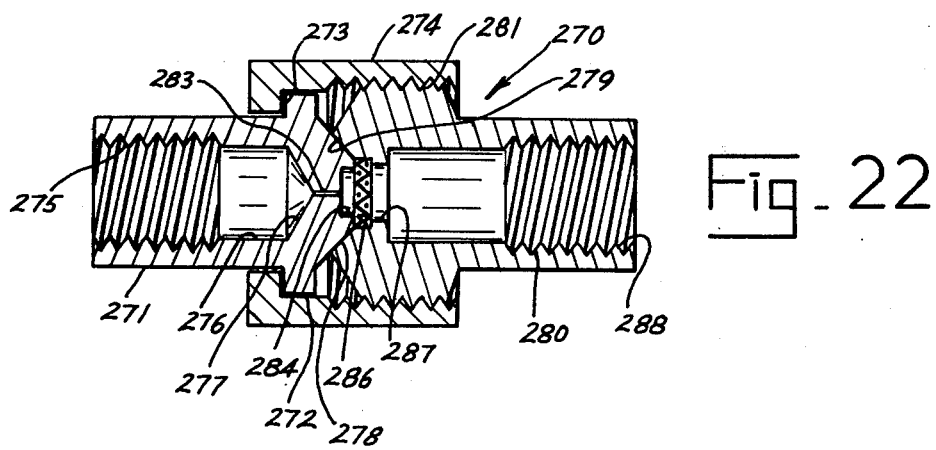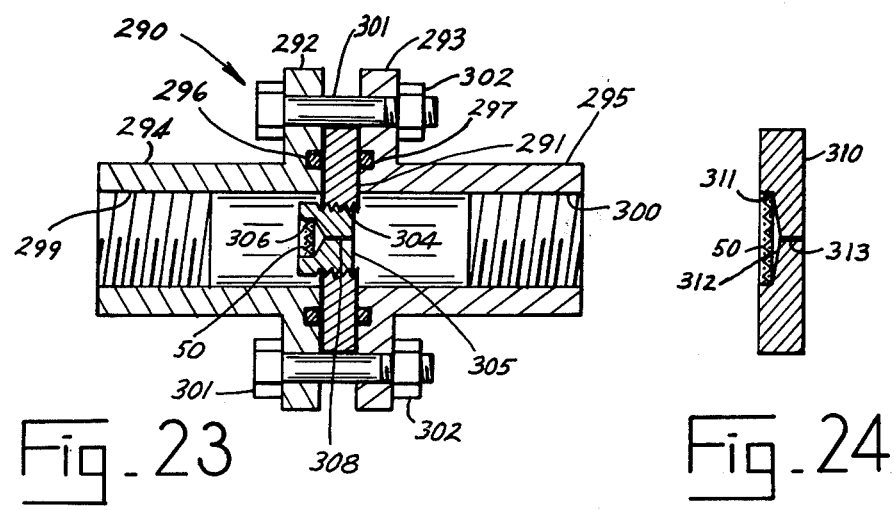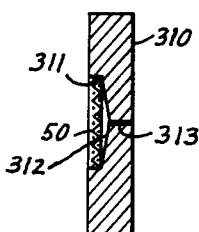

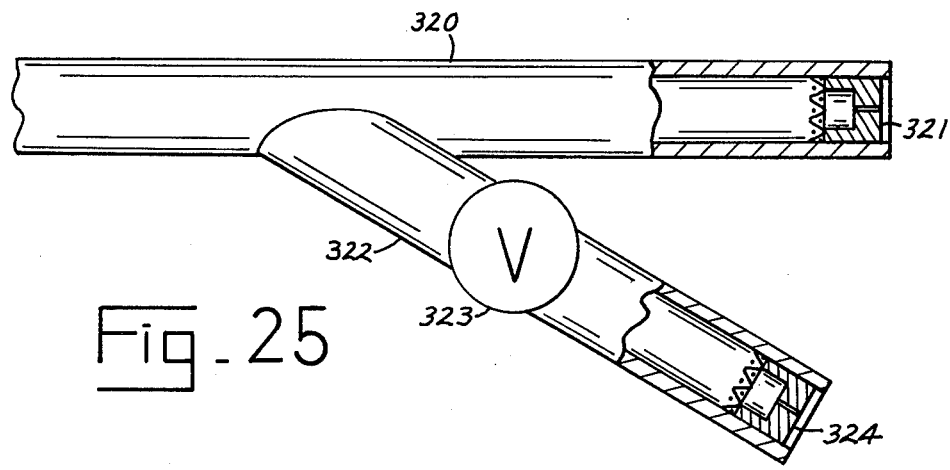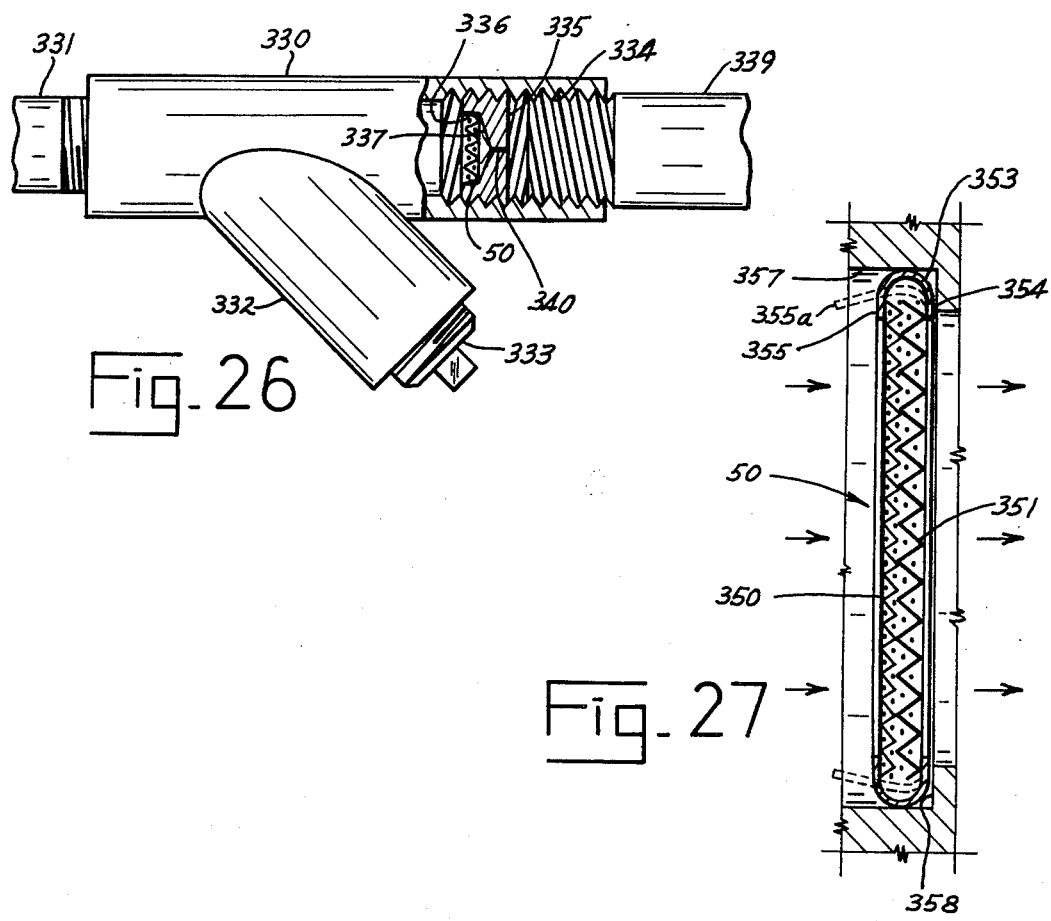

APPARATUS FOR REMOVING CONDENSATE FROM STEAM LINES, AND THE LIKE

BACKGROUND OF THE INVENTION

In U.S. Pat. No. 3,715,870, apparatus is disclosed for use in removing condensate from steam pipelines. A modified apparatus for the same purpose is disclosed in U.S. Pat. No. 3,877,895. The apparatuses as disclosed in these patents require the use of spiral wound gasket assemblies, and the strainer required upstream of the orifice to prevent plugging of the orifice is mounted within one of the spiral wound gasket assemblies. Spiral wound gasket assemblies are relatively expensive and in many applications are somewhat cumbersome and difficult to assemble. This invention presents apparatuses of simpler form wherein the aforesaid difficulties are eliminated.

SUMMARY OF THE INVENTION

The invention presents orifice devices for use in removing condensate from steam lines, and the like, wherein the apparatus is of simple form and wherein seals around the orifice device are either eliminated or are simplified and made less costly. In some modifications of the apparatus, no seal at all is required, the orifice being provided in a unitary fitting which may be screw connected or flange connected directly into a condensate line. In other manifestations, the apparatus requires the use of conventional seals used in conventional manner. The invention also provides an improved screen for use in conjunction with condensate removal orifices which is of simplified form and is easy to install. A variety of forms of apparatuses according to the invention are presented for connection to virtually any pipeline or equipment system.

A principal object of the invention is to provide condensate removal orifice apparatus of simplified structure. An additional object of the invention is to provide such apparatus wherein seals adjacent the orifice device are not required. Still another object of the invention is to provide such apparatus which is adaptable for connection to virtually any pipeline or equipment system. Yet another object of the invention is to provide such apparatus which is economical in cost, yet which is entirely dependable in use.

Other objects and advantages of the invention will appear from the following detailed description of preferred embodiments thereof, reference being made to the accompanying drawings.

BRIEF DESCRIPTIONS OF THE DRAWINGS

FIG. 6 is an axial cross section of another embodiment of apparatus according to the invention.

FIG. 7 is an end elevation of the apparatus shown in FIG. 6.

FIG. 8 is a side elevation of yet another embodiment of apparatus according to the invention.

FIG. 9 is an end elevation of the apparatus shown in FIG. 8.

FIG. 10 is a side elevation of another modified apparatus according to the invention.

FIG. 11 is an end elevation of the apparatus shown in FIG. 10.

FIG. 12 is an axial cross section of another modification of apparatus according to the invention.

FIG. 12A is a vertical cross section of a screen element used in the apparatus of FIG. 12.

FIG. 13 is an axial cross section of another embodiment of apparatus according to the invention.

FIG. 14 is an axial cross section of still another embodiment of apparatus according to the invention.

FIGS. 15–18 are axial cross sections of additonal forms of apparatus according to the invention.

FIGS. 21–23 are axial cross sections of further embodiments of apparatus according to the invention.

FIG. 24 is a vertical cross section of a modified orifice plate for use in the apparatus shown in FIG. 23.

FIG. 25 is a side elevation, partly in cross section, showing a manner of use of the apparatus.

FIG. 26 is a side elevation, partly an axial cross section, indicating how the invention may be incorporated with a Y-strainer apparatus in accordance with the invention.

FIG. 27 is an enlarged axial cross section showing the construction and manner of assembly of a strainer device used in the apparatuses.

DESCRIPTIONS OF THE PREFERRED EMBODIMENTS

Figure 1:
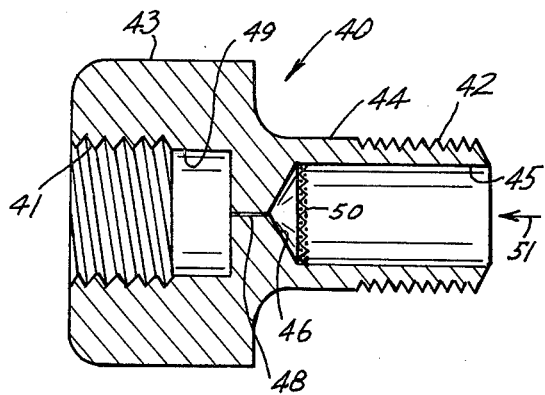
FIG. 1 is an axial cross section of a preferred embodiment of apparatus according to the invention.

The apparatuses herein disclosed are designed for use in removing condensate from steam lines, from steam systems, and from other systems from which liquid must be removed. The apparatuses are particularly useful for the removal of liquids from systems under pressure, wherein it is desired to remove pressured liquid without excessive removal of pressured gases. In steam systems, condensate accumulates in lines and vessels and it must be removed in order that the condensate will not impede the flow of steam. The apparatuses may be used to remove any liquid, whether the liquid be a condensate or not, and liquids other than water may be removed therethrough. For example, in an alcohol system wherein alcohol exists as a liquid or condenses to a liquid, the alcohol may be removed through the subject devices. The apparatuses may be used in connection with any liquid materials regardless of their nature.

For the removal of condensate or other liquid, the apparatus is installed at a location where the condensate or other liquid accumulates or collects, the pressure in the system forcing the liquid through the orifice provided in the apparatus. If all of the liquid in the system is not expelled, the liquid remaining prevents outflow of gas through the orifice. Therefore, the apparatuses according to the invention are best designed to have orifices of such size that most but not all of the condensate will be expelled therethrough so that at least some liquid remains within the system at the orifice to prevent loss of steam or other vapor or gas through the orifice.

Steam or gas loss in any event will be small because of the small sizes of the orifices.

Because of the small sizes of the orifices, which may be as small as 0.010 inch, it is necessary that the liquid be free of solids which could cause bridging or plugging of the orifice. The devices according to the invention may be used to replace conventional condensate traps, and it has been conventional in the use of condensate traps to provide a filter or strainer ahead of the trap to prevent malfunction of the trap. For this purpose, devices commonly referred to as Y-strainers are most often used. These strainers may be retained when the present apparatuses are installed. The protecting strainer or screen which removes particles and detritus from the liquids flowing out through the orifices must be of a size whereby particles which would cover or plug the orifice will be removed. For example, if the outflow orifice of a drain orifice device is 0.020 inch in diameter, the protecting screens must have openings no larger than 0.020 inch. For completely effective operation, it is preferred to retain the Y-strainers heretofore used with condensate traps ahead of the screens which accompany the orifice devices. The Y-strainers have large effective screening area while the screens accompanying the orifices have relatively small screening area. Therefore, the Y-strainers disposed in a flow system ahead of the smaller screens accompanying the orifices will collect the bulk of the solids from the liquid so that the screens accompanying the orifices will not be likely to become overburdened and plugged.

The condensate traps heretofore conventionally used for removal of condensate were subject to frequent necessity for maintenance and high maintenance costs. Mechanical failure of the traps has also been frequently encountered. By replacement of such condensate traps with drain orifice devices according to the present invention, much lower initial costs, and less maintenance and trouble will be realized. The apparatus herein presented additionally has the advantage that it cannot become stuck in the open condition which would result in excessive steam losses.

Figure 2:
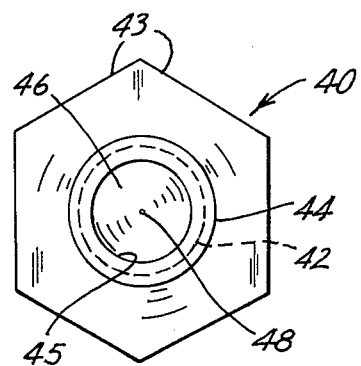
FIG. 2 is an end elevation of the apparatus shown in FIG. 1.

Referring now to the drawings in detail, and first to FIGS. 1 and 2, the drain orifice device 40 has internal threaded socket 41 and external threaded connection 42. A hexagonal formation 43 for engagement by a wrench is provided around the threaded socket 41. The device is of cylindrical shape at its portion 44 and has a cylindrical passage 45 partway therethrough. Passage 45 has a conical end 46 formed by the tip of the drill used in forming passage 45. An orifice 48 of small diameter is formed between the apex of passage portion 46 and portion 49 of socket 41 beyond the extent of the socket threads. A screen device 50 is disposed at the inner end of passage 45 adjacent the larger end of conical portion 46. Flow through the apparatus is in the direction of arrow 51 so that the liquid to be expelled through the apparatus passes through screen element 50 before reaching orifice 48. As heretofore explained, a Y-screen or similar filtering device will be provided to filter the liquid prior to its reaching the subject apparatus.

Figure 3:
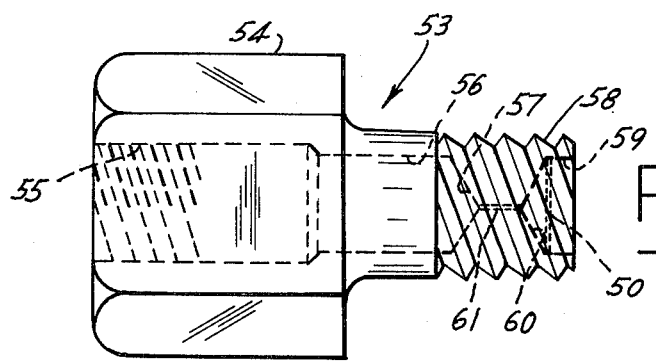
FIG. 3 is a side elevation of another preferred embodiment of apparatus according to the invention.

In FIG. 3, there is shown a drain orifice apparatus 53 which is similar to the apparatus shown in FIG. 1 except that the orifice is provided more closely adjacent to the right-hand end of the apparatus. Apparatus 53 has hexagonal exterior formation 54 surrounding threaded socket 55. Socket 55 is of reduced diameter at 56 and terminates in conical formation 57. External threads 58 are provided around the righthand portion of the apparatus as before. A short cylindrical passage 59 terminates in conical formation 60. An orifice 61 is formed between the apexes of conical formations 57 and 60. A screen element 50 is disposed at the inner end of passage 59 adjacent conical formation 60.

FIG. 2 serves as well as an end elevation of the apparatus shown in FIG. 3. In FIG. 2, the screen element 50 is omitted in order that the elements therebehind may be shown.

Figure 4:
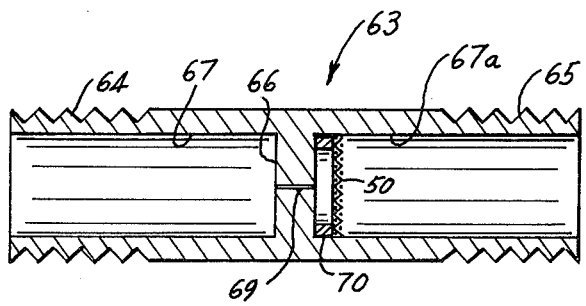
FIG. 4 is an axial cross section of a modified form of apparatus according to the invention.
Figure 5:
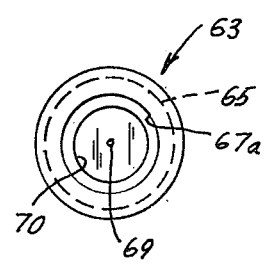
FIG. 5 is an end view of the apparatus shown in FIG. 4.

Referring now to FIGS. 4 and 5 of the drawings, drain orifice device 63 has external threads 64 around one end and external threads 65 around the opposite end. An integral circular cross plate 66 is provided, plate 66 being shown at the center of the apparatus but being capable of being provided at any location along the extent of passage 67, 67a. In fact, plate 66 may be at either terminus of passage 67, 67a. An orifice 69 is formed through plate 66. Spacer ring 70 supports a screen element 50 spaced from the right-hand side of the circular plate 66.

In the embodiments of FIGS. 1, 3 and 4, the screen elements 50 are shown spaced from the entrances to the orifices 48, 61, and 69. This is necessary in order that maximal flow may be obtained through the orifices. If the screen elements were disposed directly over the entrances to the orifices, flow restriction would occur which would hinder the liquid draining capabilities of the drain orifice devices.

A drain orifice apparatus 73 of modified form is shown in FIGS. 6 and 7 of the drawings. Apparatus 73 has a hexagonal form over its full length at its external surface 74. A cylindrical passage 76, 76a is provided through the apparatus, a reduced portion 76c being provided at one side of integral circular plate formation 77. Internal threads 78 are provided at the lefthand end of passage portion 76. A shoulder 80 for maintaining screen device 50 spaced from plate formation 77 is provided at the end of reduced passage portion 76c. Orifice 82 is formed through plate formation 77.

The drain orifice device 85 shown in FIGS. 8 and 9 has a hexagonal exterior formation at its central part 86. At its lefthand end, device 85 is reduced and cylindrical at 87 around which external threads 88 are provided. At its righthand end, device 85 is symetrically cylindrical at 89, external threads 90 being formed around the terminal portion of cylindrical portion 89. Cylindrical flow passages 91, 91a have conical formations formed by the drilling tool, the conical formation at the end of passage 91 being indicated by reference numeral 92 and the conical formation at the inner end of cylindrical passage 91a being indicated by reference numeral 93. Between formations 92, 93 integral formation 94 remains, through which orifice 95 is formed. A screen element 50 is disposed at the inner end of passage 91a adjacent to conical end 93. It will be realized that screen element 50 may equally suitable be disposed at the inner end of passage 91.

Referring now to FIGS. 10 and 11 of the drawings, drain orifice apparatus 97 is of hexagonal form at its outer surfaces 98. A concentric cylindrical passage 99 has internal threads 100 at its lefthand end. Concentric cylindrical passage 102 has internal threads 103 at its righthand end. Passage 99 terminates inwardly at conical formation 104, and cylindrical 102 terminates inwardly at conical formation 105. Between formations 104, 105, formation 106 is provided through which orifice 107 is formed. A screen element 50, shown at the inner end of passage 102, may be installed at the inner end of either passage 99 or passage 102.

The apparatus shown in FIG. 12 includes a tubular body 111 having a cylindrical axial passage 112 having threaded socket formations 113, 114 at its opposite ends. Exterially threaded pipes 115, 116 are screwed into threaded sockets 113, 114, respectively. A circular disc or plate 117 having orifice opening 118 therethrough has circular O-ring seals 119, 120 at opposite sides, the seals 119, 120 being in engagement around the passage 112. Spacer rings 121, 122 engage the ends of pipes 115, 116, respectfully, and the seals 119, 120. A screen element 50a of hemispheral configuration is engaged against the righthand side of disc 117 as shown. Flow is in the direction of arrow 121. The configuration of screen 50a is indicated in FIG. 12A.

Referring now to FIG. 13 of the drawings, the drain orifice apparatus 126 includes an outwardly cylindrical or hexagonal body 127 having interior threads 128 at one end and interior threads 129 at the other end. The central passage portion 130 is of cylindrical form. Spacer rings 131, 132 engage the inner ends of pipe sections 133, 134 which are screwed into the threaded formations 128, 129 respectively. An orifice body 135 has a cylindrical recess 136 at one side and a conical recess 137 at the opposite side. An orifice 138 is drilled therethrough at the apex of conical formation 137. A screen element 50 is engaged within ring 132 at the large end of conical formation 135. Flow is in the direction of arrow 141. O-ring seals 139, 140 are disposed in rectangular grooves around the opposite sides of body 135. The seals engage the rings 131, 132 to seal around the orifice body.

In FIG. 14, there is shown a drain orifice device 145 including a body 146 which may be outwardly cylindrical or hexagonal and which is threaded therethrough at 147. Pipes 148, 149 are screwed into the opposite ends of body 146. An orifice disc body 150 has a cylindrical recess 151 at its righthand side over which a screen element 50 is disposed in engagement with the interior of pipe 149. Disc 150 has orifice 152 formed therethrough. O-ring seals 153, 154 are disposed in circular grooves around body 150 in engagement with the ends of pipes 148, 149.

The drain orifice device 160 shown in FIG. 15 has enlarged hexagonal portion 161 at one end and reduced cylindrical portion 162 at its opposite end. Internal threads 163 are formed in a passage within portion 161 and external threads 164 are formed around the end portion of body portion 162. A cylindrical passage 165 communicates with the threaded socket formation 163. An orifice disc body 167 is fitted in the inner end of socket formation 163 beyond the threads thereof and is retained in place by split ring 168. A spacer ring 171 engages the opposite side of disc 167 and a screen fitting 50 is engaged thereagainst and in contact around passage 165. Disc 167 has orifice 169 therethrough. An O-ring 170 is disposed in a peripheral groove around disc 167 in contact with the socket wall beyond the termination of the threads therein. A threaded pipe end (not shown) screwed into threaded socket 163 retains the split ring 168 and disc 167 against movements axially of the fitting.

A very simple drain orifice device 172 is shown in FIG. 16. Body 173 is cylindrical and has external threads 174, 175 around its opposite ends. A cylindrical passage or bore 176 terminates at conical formation 177. Orifice 178 is formed from the apex of conical formation 177 to the end of body 173. A screen element 50 is disposed at the lefthand end of passage or bore 176 adjacent the larger end of conical formation 177 which spaces the screen element 50 from the entrance into orifice 178. This device may be connected by ordinary pipe couplings to a pipe line or other equipment.

Drain orifice device 180 shown in FIG. 17 includes a body 181 having enlarged hexagonal or cylindrical portion 182 and reduced cylindrical portion 183 around which threads 184 are provided. Cylindrical passage 185 enlarges at 186 and 187 to provide shoulders 188 and 189. Threads 190 are provided at the left end of enlarged passage portion 187. A screen element 50 is disposed within passage portion 187 against shoulder 189. Orifice body 191 has orifice 192 therethrough and O-ring 193 is disposed in a peripheral groove therearound. A split retainer ring 194 is disposed against body 191 as shown.

Figure 18:
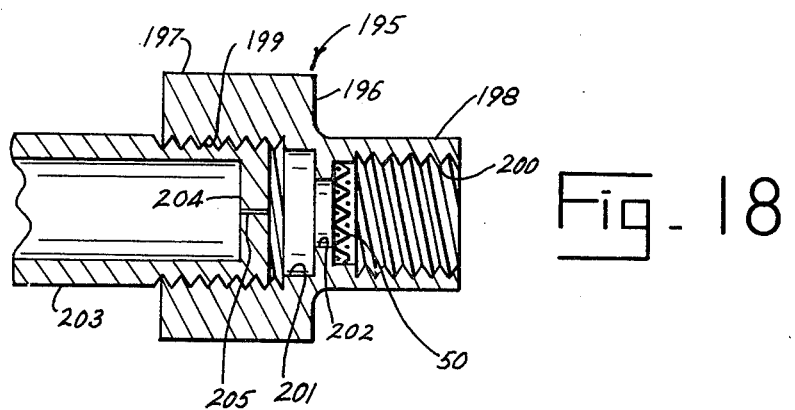

Drain orifice apparatus 195 of FIG. 18 includes a body 196 having hexagonal enlarged end portion 197 and reduced cylindrical portion 198. Internal threads 199 are provided at one end and internal threads 200 are provided at the opposite end. A passage having larger portion 201 and reduced portion 202 communicates between the opposite ends of the apparatus. A screen element 50 is disposed at the inner end of the socket of which threads 200 form a part, beyond the threads. A pipe 203 having closed end 204 is externally threaded at its end and screwed into threads 199. An orifice 205 is formed through the closed end of pipe 203. Pipe 203 may be of any form at its lefthand end for connection to a pipeline or other apparatus.

Figure 19:
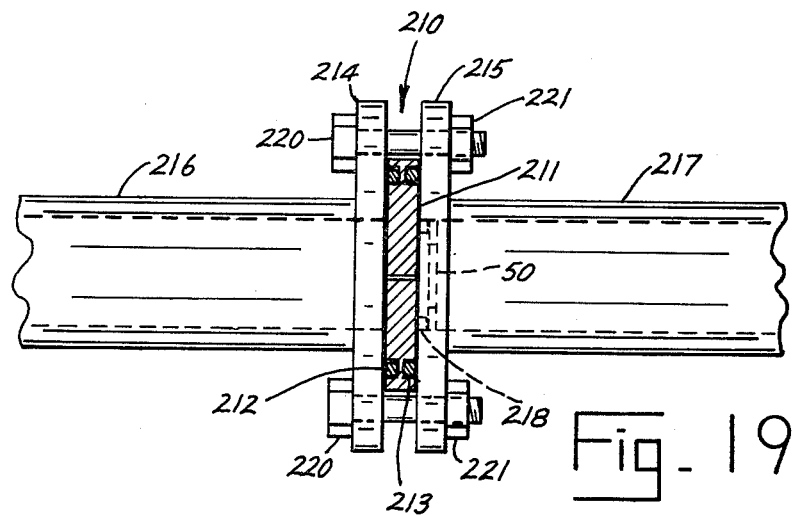
FIG. 19 is a side elevation, partly end vertical cross section, showing a further modified form of apparatus according to the invention.

Referring now to FIG. 19 of the drawings, the drain orifice device 210 therein shown includes a circular orifice disc or plate 211 having circular grooves therearound at its opposite faces in which O-ring seals 212, 213 are disposed. Seals 212, 213 sealingly engage the faces of flanges 214, 215 forming the ends of pipes 216, 217, respectively. A spacer ring 218 and screen element 50 are disposed as shown against one side of disc 211. Flanges 214, 215 are secured together by bolts 220 and nuts 221.

Figure 20:
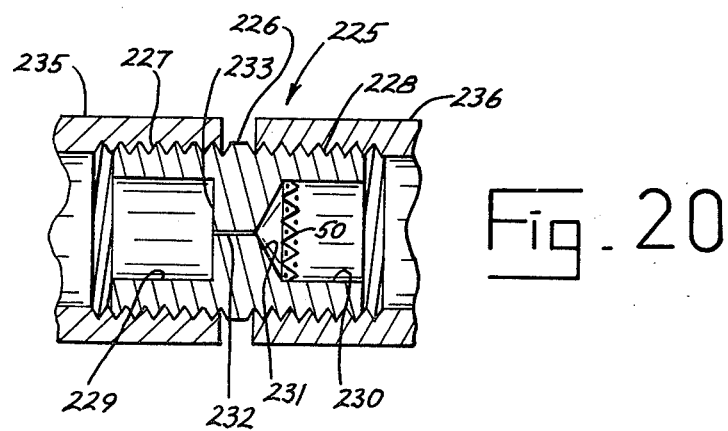
FIG. 20 is another embodiment of apparatus according to the invention.

Referring now to FIG. 20 of the drawings, drain orifice device 225 includes a body 226 having external threads 227, 228 at its opposite ends. A cylindrical passage 229 is concentrically provided into the lefthand end of body 226 and a cylindrical passage 230 having conical end 231 is formed in the opposite end of body 226. An orifice 232 is provided through central web 233 from the apex of conical formation 231. A screen element 50 is disposed at the inner end of passage adjacent conical formation 231 and is spaced by the conical formation from the entrance into orifice 232. Pipe couplings 235, 236 are shown screwed onto the opposite ends of body 226, but body 226 may be screwed into any internally threaded device for connection to the drain location for withdrawal of condensate or other liquid from a system.

The drain orifice device 241 shown in FIG. 21 of the drawings includes a body 242 having cylindrical end portions 243, 244 and enlarged cylindrical central portion 245 having oppositely facing conical faces 246, 247. Cylindrical bores 248, 249 terminate in conical portions 250, 251, respectively, and orifice 252 is formed between the apexes of conical formations 250, 251. O-ring seals 253, 254 are disposed in circular grooves around the peripheries of end portions 243, 244 and bear against the interiors of flanged pipe sections 256, 257. Pipe sections 256, 257 have conical shoulders 258, 259, respectively, which bear against the conical shoulders 246, 247. Flanges 260, 261 are connected by bolts 262 and nuts 263. Pipe sections 256, 257 may be connected to other equipment by flange or thread connections as suitable for the purpose at hand. A screen element 50 is disposed aganst the righthand end of body 245 in engagement with the interior passage of pipe section 257. A screen element 50 could alternatively be disposed in either of the passages 248 or 249.

Referring now to FIG. 22 of the drawings, a pipe union structure for a drain orifice device 270 is shown. Fitting 271 has enlarged shoulder 272 therearound which is engaged by inwardly projecting shoulder 273 of fitting 274. Fitting 271 is interially threaded at 275 and has continuing passage 276 terminating in conical formation 277. Conical end 278 of fitting 271 is engaged by conical end 279 of a fitting 280 which is screwed into threads 281 of fitting 274. The surfaces of conical ends 278, 279 are smoothly machined surfaces whereby a seal is formed at their abutment. Orifice 283 is formed from the apex of conical formation 277 to the center end of fitting 271 which is cylindrically recessed at 284. A screen element 50 is disposed in a cylindrical recess 286 formed around the end of fitting 280, at the inner end of a reduced passage 287 formed at the inner end of threaded socket 288. The exterior of fitting 274 may be hexagonal to provide for engagement by a wrench if desired. Recess 284 spaces screen element 50 from the entrance to the orifice 283.

Referring now to FIG. 23 of the drawings, drain orifice device 290 includes a circular plate or disc 291 which is clamped between flanges 292, 293, of fittings 294, 295, respectively. O-ring seals 296, 297 are provided in circular grooves around flanges 292, 293, as shown, the O-ring seals engaging opposite sides of disc 291. Fitting 294 is internally threaded at 299 and fitting 295 is internally threaded at 300. Flanges 292, 293 are connected by bolts 301 and nuts 302. Disc 291 has threaded opening 304 therethrough into which is screwed an externally threaded body 305. Body 305 has a cylindrical recess 306 at its lefthand end within which a screen fitting 50 is received. The inner end of recess 306 is conical and an orifice 308 extends from the apex of the conical formation to the righthand side of body 305. Bodies 305 having different diameter orifices 308 therethrough may be interchangeably employed in this form of apparatus.

In FIG. 24, there is shown a circular disc or plate 310 which may be used in place of disc or plate 291 of FIG. 23. Disc 301 has a shallow cylindrical recess 311 terminating at conical formation 312 into which screen element 50 is disposed. An orifice 313 extends from the apex of conical formation 312 to the righthand side of disc 310. Discs 310 having different sizes of orifices 313 may be employed for different pressure and liquid volume flow conditions.

Referring now to FIG. 25 of the drawings, there is illustrated a manner in which plural drain orifice devices may be employed where the amount of condensate to be drained varies. Pipe 320 has a drain orifice device 321 of any disclosed form installed at its righthand end. Branch pipe 322 having valve 323 has a second drain orifice device 324 of any suitable form installed at its righthand end. Under normal conditions, valve 323 will be closed and condensate flow will take place through pipe 320 and drain orifice device 321. Should excessive condensate or other liquid flow occur, then valve 323 may be opened to permit condensate or liquid drainage through drain orifice device 324. In this way, excess condensate or liquid which must be drained may be relieved without altering of the drain orifice device in use and without shutting down of any of the equipment.

In FIG. 26, element 330 is a Y-strainer device of modified form which includes a drain orifice device combined therein. An inlet pipe 331 is shown connected to the lefthand end of Y-strainer 330. Y-strainer 330 includes angular portion 332 closed by threaded plug 333. A conventional strainer unit is disposed within tube 332 in the customary manner. The righthand end of Y-strainer 330 has interior threads 334 into which is screwed an externally threaded orifice plug 335 having cylindrical recess 336 terminating in conical formation 337 and in which is disposed a strainer element 50. A threaded pipe 339 is screwed into threads 334 to convey condensate or liquid drained through orifice 340. In operation of the apparatus shown in FIG. 26, the strainer unit of Y-strainer 330 first filters the condensed liquid, after which the liquid passes through secondary strainer element 50 before arriving at orifice 340. No separate drain orifice device need be provided when this modified form of Y-strainer including a drain orifice device is employed.

Referring now to FIG. 27 of the drawings, the strainer elements 50 hereinbefore referred to will be further described. Each strainer unit 50 includes a fine mesh screen 350 and a course mesh screen 351 provided to support the fine mesh screen. Screens 350 and 351 are disposed flushly one against the other. A rim 353 has flange 354 at one side and flange 355 at the other side. When the strainer elements are installed in a drain orifice apparatus, the flange 355 is open at position 355a. The strainer element is positioned in an opening 357 of a drain orifice device with flange 354 against a shoulder 358. After insertion of the screen element into the opening 357, the flange 355 in position 355a is compressed by a suitable ring shaped tool to its position 355 flushly against the fine mesh screen 350. Compression of flange 355 from position 355a to position 355 expands the rim 353 tightly against the sides of opening 357 so that the screen element becomes sealed in opening 357 around its periphery. This structure and manner of installation of the screen elements eliminates the necessity for separate seals around the screen elements and greatly simplifies the drain orifice structure.

The orifices provided in the various forms of the apparatus may be formed in a variety of ways. The orifices may be drilled, or may be formed by an electronic disintegrating machine, or may be formed by a lazer beam. Drilling is a fairly time consuming and expensive operation. Since the drain orifice devices are preferably made of a material such as Type 304 stainless steel, which is difficult to drill, a high rate of drill bit breakage occurs even though cobalt drills or other forms of special drills are employed.

Where the drain orifice devices have hexagonal outer surfaces, they are conveniently manufactured using hexagonal bar stock. This procedure somewhat simplifies the manufacture of the drain orifice devices.

Any material suitable for the contemplated use of the drain orifice devices may be employed. For example, in the case of fruit juices, certain types of Monel steels may be employed. A qualified metallurgist will be capable of specifying the material to be used in any service.

The invention provides drain orifice devices of simplified structure and in many cases of a reduced number of parts. The O-ring seals employed may be formed of any suitable material known in the art. It is well known that O-ring seals are capable of withstanding very high pressure conditions. Other forms of seals, gaskets or packing may also be used, the O-ring seals being shown by way of example because of their simple forms.

While preferred embodiments of the apparatus have been described and shown in the drawings, many modifications thereof may be made by a person skilled in the art without departing from the spirit of the invention, and it is intended to protect by Letters Patent all forms of the invention falling within the scope of the following claims.

I claim:

1. Drain orifice apparatus, comprising body means having a flow passage therethrough, plate means unitarily formed with said body means disposed to close said flow passage, an orifice through said plate means communicating between the opposite sides of said plate means for restricted fluid flow therethrough, screen means tightly fitted around its entire outer periphery around the entire interior periphery of the wall of said flow passage in spaced proximity to one side of said plate means for removing detritus which would block said orifice from fluids flowing through said flow passage in a direction through said screen means toward said orifice, a screen supporting shoulder disposed around one end of said orifice between said one end of said orifice and said screen means and against which said screen means is disposed, said screen means being constructed to be passable to against said shoulder through the portion of said flow passage at said one side of said plate means in a direction longitudinal of said flow passage portion, said flow passage portion being of uniform diameter over all of its length between one end of said body means and said screen supporting shoulder and said screen means being of the same diameter.

2. The combination of claim 1, wherein said screen means comprises a fine mesh screen having openings no larger than the size of said orifice and a coarse mesh screen having larger openings, said screens being disposed one against the other across said flow passage with said coarse mesh screen being disposed at the side toward said plate means.

3. The combination of claim 2, said screen means including a rim therearound having a U-shaped cross section enveloping the edges of both said fine mesh screen and said coarse mesh screen at its opposite sides and compressively engaged against the sides of said flow passage at its central portion.

4. The combination of claim 1, said plate means being unitary with said body means.

5. The combination of claim 4, said plate means being intermediate the length of said flow passage.

6. The combination of claim 5, said flow passage having a conical portion the apex of which is toward said orifice at one side of said plate means, said conical portion providing said screen supporting shoulder against which said screen means is disposed.

7. The combination of claim 5, said screen supporting shoulder being formed by ring means engaged between the peripheries of said screen means and said plate means.

8. The combination of claim 5, said plate means being closer to one end of said flow passage than to the other end of said flow passage.

9. The combination of claim 1, said plate means being disposed at an end of said flow passage at an end of said body means and said flow passage comprising a continuous passage to one side of said plate means.

10. The combination of claim 9, wherein said screen means comprises a fine mesh screen having openings no larger than the size of said orifice and a coarse mesh screen having larger openings, said screens being disposed one against the other across said flow passage with said coarse mesh screen being disposed at the side toward said plate means.

11. The combination of claim 10, said screen means including a rim therearound having a U-shaped cross section enveloping the edges of both said fine mesh screen and said coarse mesh screen at its opposite sides and compressively engaged against the sides of said flow passage at its central portion.

12. The combination of claim 1, said body means comprising plural body parts connected together to form a body structure.

13. The combination of claim 1, said body means being externally threaded and being screwed into an internal thread formation around the outlet of a Y-strainer, said Y-strainer comprising a tubular body having said internal thread formation around an end thereof comprising said outlet and having an angular outlet intermediate its length.

14. The combination of claim 1, said body means being disposed at the end of a pipe through which fluid may be directed toward said screen means and orifice thereof, said pipe having a valved branch portion having an additional body means disposed at its end through which excess fluid may be directed.

15. The combination of claim 1, said plate means being sealingly disposed against said screen supporting shoulder.

16. Drain orifice apparatus, comprising body means having a flow passage therethrough, plate means disposed to close said flow passage, an orifice through said plate means communicating between the opposite sides of said plate means for restricted fluid flow therethrough, screen means tightly fitted around its entire outer periphery around the entire interior periphery of the wall of said flow passage in spaced proximity to one side of said plate means for removing detritus which would block said orifice from fluids flowing through said flow passage in a direction through said screen means toward said orifice, a screen supporting shoulder disposed around one end of said orifice between said one end of said orifice and said screen means and against which said screen means is disposed, said screen means being constructed to be passable to against said shoulder through the portion of said flow passage at said one side of said plate means in a direction longitudinal of said flow passage portion, said flow passage portion being of uniform diameter and said screen means being of the same diameter, said screen means comprising a fine mesh screen having openings no larger than the size of said orifice and a coarse mesh screen having larger openings, said screens being disposed one against the other across said flow passage with said coarse mesh screen being disposed at the side toward said plate means, said screen means including a rim therearound having a U-shaped cross section enveloping the edges of both said fine mesh screen and said coarse mesh screen at its opposite sides and tightly fitted against the sides of said flow passage portion at its central portion, said rim of said screen means being tightly fitted in said flow passage portion as described as the result of one side of said rim having been bent from a position parallely against said wall of said flow passage portion and away from said screen means to a position radial with respect to said wall and against said screen means whereby said central portion of said rim is in an expanded condition against said wall of said flow passage portion.

17. Drain orifice comprising body means having a flow passage therethrough, plate means disposed to close said flow passage, an orifice through said plate means communicating between the opposite sides of said plate means for restricted fluid flow therethrough, screen means tightly fitted around its entire outer periphery around the entire interior periphery of the wall of said flow passage in spaced proximity to one side of said plate means for removing detritus which would block said orifice from fluids flowing through said flow passage in a direction through said screen means toward said orifice, a screen supporting shoulder disposed around one end of said orifice between said one end of said orifice and said screen means and against which said screen means is disposed, said screen means being constructed to be passable to against said shoulder through the portion of said flow passage at said one side of said plate means in a direction longitudinal of said flow passage portion, said flow passage portion being of uniform diameter and said screen means being of the same diameter, said plate means being disposed at an end of said flow passage at an end of said body means and said flow passage comprising a continuous passage to one side of said plate means, said screen means comprising a fine mesh screen having openings no larger than the size of said orifice and a coarse mesh screen having larger openings, said screens being disposed one against the other across said flow passage with said coarse mesh screen being disposed at the side toward said plate means, said screen means including a rim therearound having a U-shaped cross section enveloping the edges of both said fine mesh screen and said coarse mesh screen at its opposite sides and compressively engaged against the sides of said flow passage at its central portion, one side of said rim being bent from a position away from said screen means to against said screen means to expand said rim in said flow passage.

18. Drain orifice apparatus comprising body means having a flow passage therethrough, plate means disposed to close said flow passage, an orifice through said plate means communicating between the opposite sides of said plate means for restricted fluid flow therethrough, screen means tightly fitted around its entire outer periphery around the entire interior periphery of the wall of said flow passage in spaced proximity to one side of said plate means for removing detritus which would block said orifice from fluids flowing through said flow passage in a direction through said screen means toward said orifice, a screen supporting shoulder disposed around one end of said orifice between said one end of said orifice and said screen means and against which said screen means is disposed, said screen means being constructed to be passable to against said shoulder through the portion of said flow passage at said one side of said plate means in a direction longitudinal of said flow passage portion, said flow passage portion being of uniform diameter and said screen means being of the same diameter, said body means comprising plural body parts connected together to form a body structure, said plural body parts of said body means comprising a tubular member having internally threaded ends and having said screen supporting shoulder projecting inwardly annularly therearound, and a pipe member having a closed end forming said plate means screwed into one of said internally threaded ends, said screen means being disposed against said shoulder at the side thereof opposite said pipe member.

19. Drain orifice apparatus, comprising body means having a flow passage therethrough, plate means disposed to close said flow passage, an orifice through said plate means communicating between the opposite sides of said plate means for restricted fluid flow therethrough, screen means tightly fitted around its entire outer periphery around the entire interior periphery of the wall of said flow passage in spaced proximity to one side of said plate means for removing detritus which would block said orifice from fluids flowing through said flow passage in a direction through said screen means toward said orifice, a screen supporting shoulder disposed around one end of said orifice between said one end of said orifice and said screen means and against which said screen means is disposed, said screen means being constructed to be passable to against said shoulder through the portion of said flow passage at said one side of said plate means in a direction longitudinal of said flow passage portion, said flow passage portion being of uniform diameter and said screen means being of the same diameter, said body means comprising plural body parts connected together to form a body structure, said plural body parts of said body means comprising a first pipe member having a closed end forming said plate means and having an externally projecting annular shoulder therearound, a second pipe member connected to said first pipe member with an end thereof sealingly abutted against said closed end of said first pipe member and having external threads around said end thereof, and a collar having an inwardly projecting annular shoulder therearound adapted to abut said externally projecting annular shoulder and having internal threads adapted to engage said external threads for holding said pipe member ends abutted together, said screen means being disposed in a cylindrical recess in said end of said second pipe member and being disposed against said closed end of said first pipe member, said closed end of said first pipe member being recessed inwardly of the outer edge portion of said screen means at the side of said closed end against which said screen means is disposed.

20. Drain orifice apparatus, comprising body means having a flow passage therethrough, plate means disposed to close said flow passage, an orifice through said plate means communicating between the opposite sides of said plate means for restricted fluid flow therethrough, screen means tightly fitted around its entire outer periphery around the entire interior periphery of the wall of said flow passage in spaced proximity to one side of said plate means for removing detritus which would block said orifice from fluids flowing through said flow passage in a direction through said screen means toward said orifice, a screen supporting shoulder disposed around one end of said orifice between said one end of said orifice and said screen means and against which said screen means is disposed, said screen means being constructed to be passable to against said shoulder through the portion of said flow passage at said one side of said plate means in a direction longitudinal of said flow passage portion, said flow passage portion being of uniform diameter and said screen means being of the same diameter, said body means comprising plural body parts connected together to form a body structure, said plural body parts of said body means comprising a pair of pipe members each having an end flange, means for securing said end flanges together, said plate means being sealedly disposed between said end flanges, said plate means having tubular means extending from each side thereof into said pipe members, and seal means disposed around each said tubular means for sealing between said plate means and each said pipe member.

21. Drain orifice apparatus, comprising body means having a flow passage therethrough, plate means disposed to close said flow passage, an orifice through said plate means communicating between the opposite sides of said plate means for restricted fluid flow therethrough, screen means tightly fitted around its entire outer periphery around the entire interior periphery of the wall of said flow passage in spaced proximity to one side of said plate means for removing detritus which would block said orifice from fluids flowing through said flow passage in a direction through said screen means toward said orifice, a screen supporting shoulder disposed around one end of said orifice between said one end of said orifice and said screen means and against which said screen means is disposed, said screen means being constructed to be passable to against said shoulder through the portion of said flow passage at said one side of said plate means in a direction longitudinal of said flow passage portion, said flow passage portion being of uniform diameter and said screen means being of the same diameter, said body means comprising plural body parts connected together to form a body structure, said plural body parts of said body means comprising a pair of pipe members each having an end flange, means for securing said end flanges together, said plate means being sealedly disposed between said end flanges, said orifice having threads therearound and an externally threaded body screwed thereinto.

22. Drain orifice apparatus, comprising body means having a flow passage therethrough, plate means disposed to close said flow passage, an orifice through said plate means communicating between the opposite sides of said plate means for restricted fluid flow therethrough, screen means tightly fitted around its entire outer periphery around the entire interior periphery of the wall of said flow passage in spaced proximity to one side of said plate means for removing detritus which would block said orifice from fluids flowing through said flow passage in a direction through said screen means toward said orifice, a screen supporting shoulder disposed around one end of said orifice between said one end of said orifice and said screen means and against which said screen means is disposed, said screen means being constructed to be passable to against said shoulder through the portion of said flow passage at said one side of said plate means in a direction longitudinal of said flow passage portion, said flow passage portion being of uniform diameter and said screen means being of the same diameter, said body means comprising plural body parts connected together to form a body structure, said plural body parts of said body means comprising a pair of pipe members each having an end flange, means for securing said end flanges together, said plate means being sealedly disposed between said end flanges, said plate means having a cylindrical recess at one side within said screen means is disposed and having a conical recess having said orifice leading from its apex disposed between said cylindrical recess and said orifice and forming said screen supporting shoulder.

* * * * *